United States Patent
Heo et al.

(10) Patent No.: US 8,042,018 B2
(45) Date of Patent: Oct. 18, 2011

(54) METHOD AND APPARATUS FOR TRANSMITTING/RECEIVING ACK/NACK IN A FREQUENCY DIVISION MULTIPLE ACCESS SYSTEM

(75) Inventors: Youn-Hyoung Heo, Suwon-si (KR); Ju-Ho Lee, Suwon-si (KR); Sung-Ho Choi, Suwon-si (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1093 days.

(21) Appl. No.: 11/841,404

(22) Filed: Aug. 20, 2007

(65) Prior Publication Data

US 2008/0046793 A1    Feb. 21, 2008

(30) Foreign Application Priority Data

Aug. 18, 2006  (KR) .................. 10-2006-0078413
Jul. 27, 2007   (KR) .................. 10-2007-0075638

(51) Int. Cl.
  *G08C 25/02*  (2006.01)
  *H04L 1/18*   (2006.01)
  *H03M 13/00*  (2006.01)

(52) U.S. Cl. ........................ 714/748; 714/774

(58) Field of Classification Search ............ 714/748, 714/774
See application file for complete search history.

(56) References Cited

U.S. PATENT DOCUMENTS

| | | | |
|---|---|---|---|
| 6,839,336 B2* | 1/2005 | Tiedemann et al. | 370/335 |
| 6,987,780 B2* | 1/2006 | Wei et al. | 370/469 |
| 7,126,928 B2* | 10/2006 | Tiedemann et al. | 370/329 |
| 7,155,236 B2* | 12/2006 | Chen et al. | 455/454 |
| 7,289,766 B2* | 10/2007 | Wang et al. | 455/63.1 |
| 7,292,873 B2 | 11/2007 | Wei et al. | |
| 7,315,527 B2* | 1/2008 | Wei et al. | 370/328 |
| 7,331,008 B2* | 2/2008 | Cheng et al. | 714/748 |
| 7,406,063 B2* | 7/2008 | Jung et al. | 370/329 |
| 7,436,857 B2* | 10/2008 | Fong et al. | 370/498 |
| 7,447,968 B2* | 11/2008 | Ha et al. | 714/748 |
| 7,480,279 B2* | 1/2009 | Kim | 370/335 |
| 7,502,385 B2* | 3/2009 | Wei et al. | 370/469 |
| 7,548,509 B2* | 6/2009 | Tiedemann et al. | 370/209 |
| 7,555,069 B2* | 6/2009 | Kim | 375/340 |
| 7,561,849 B2* | 7/2009 | Seol | 455/69 |

(Continued)

FOREIGN PATENT DOCUMENTS

KR    1020010084095    9/2001

(Continued)

*Primary Examiner* — Joseph D Torres
(74) *Attorney, Agent, or Firm* — The Farrell Law Firm, P.C.

(57) ABSTRACT

A method and apparatus for transmitting/receiving an ACKnowledgement/Negative ACKnowledgement (ACK/NACK) signal to support packet data retransmission in an Frequency Division Multiple Access (FDMA) wireless communication system are provided, in which a User Element (UE) generates an ACK/NACK signal for received packet data, determines whether the UE is set to support ACK/NACK repetition, transmits the ACK/NACK signal on a basic response channel mapped to one of a DCH on which the packet data was received and a Shared Control Channel (SCCH) carrying scheduling information about the packet data, if the UE is not set to support ACK/NACK repetition, and selects one of supplementary response channels for each ACK/NACK repetition, the supplementary response channels being allocated for ACK/NACK repetition and repeatedly transmits the ACK/NACK signal on the selected supplementary response channel according to a predetermined repetition factor, if the UE is set to support ACK/NACK repetition.

18 Claims, 15 Drawing Sheets

U.S. PATENT DOCUMENTS

| | | | |
|---|---|---|---|
| 7,590,094 B2 * | 9/2009 | Qian et al. | 370/332 |
| 7,813,291 B2 | 10/2010 | Yoon et al. | |
| 2003/0131299 A1 | 7/2003 | Ahn et al. | |
| 2005/0249133 A1 | 11/2005 | Terry et al. | |
| 2008/0168321 A1 * | 7/2008 | Lim et al. | 714/748 |
| 2008/0175195 A1 * | 7/2008 | Cho et al. | 370/329 |
| 2008/0259855 A1 * | 10/2008 | Yoon et al. | 370/329 |
| 2008/0293424 A1 * | 11/2008 | Cho et al. | 455/450 |

FOREIGN PATENT DOCUMENTS

| | | |
|---|---|---|
| KR | 1020050062359 | 6/2005 |
| KR | 1020060063938 | 6/2006 |

* cited by examiner

US 8,042,018 B2

METHOD AND APPARATUS FOR TRANSMITTING/RECEIVING ACK/NACK IN A FREQUENCY DIVISION MULTIPLE ACCESS SYSTEM

CROSS-REFERENCE TO RELATED PATENT APPLICATION

This application claims priority under 35 U.S.C. §119(a) to a Korean Patent Application filed in the Korean Intellectual Property Office on Aug. 18, 2006 and assigned Serial No. 2006-78413, and a Korean Patent Application filed in the Korean Intellectual Property Office on Jul. 27, 2007 and assigned Serial No. 2007-75638 the entire disclosure of which is hereby incorporated by reference.

BACKGROUND OF THE INVENTION

1. Field of the Invention

The present invention relates to an apparatus and method for transmitting/receiving an ACKnowledgement/Negative ACKnowledgement (ACK/NACK) signal for received packet data in order to support Hybrid Automatic Repeat reQuest (HARQ) in a Frequency Division Multiple Access (FDMA) wireless communication system.

2. Description of the Related Art

With reference to FIG. 1, FDMA will first be described below. FIG. 1 illustrates FDMA.

Referring to FIG. 1, FDMA is a technology for distinguishing physical channels in frequency. In general, all available resources are divided in time and frequency as indicated by reference numeral 101. A minimum block is composed of one symbol in time and one subcarrier in frequency. This is called a Time-Frequency (TF) bin. A TF bin is an actual transmission unit carrying a modulation symbol on a physical channel. The total number of TF-bins depends on a total frequency bandwidth and the number of symbols transmittable in a Transmission Time interval (TTI).

In FDMA, different TF bins are allocated to different channels and different User Equipments (UEs). Basically, it is impossible to share one TF bin between different channels or different UEs. However, to achieve time diversity, frequency diversity, or spatial diversity for a low-rate channel, a TF bin can be shared by covering or spreading the TF bin with a code as with Code Division Multiplexing (CDM). For transmission of high-rate packet data, TF bins are purely allocated. Mapping between data symbols and TF bins is equivalent to subcarrier mapping 102. The mapping relationship between a channel and TF bins is signaled beforehand or determined according to a predefined rule.

Since a channel carrying packet data or a channel carrying signaling data is allocated on a UE basis, TF bins are allocated to the channel and then the channel with TF bins is allocated to an intended UE. Although TF bins can be allocated on a UE basis, TF bins allocated to a specific channel form a logical channel as indicated by reference numeral 103, which is preferable in terms of signaling. One logical channel (hereinafter, "channel") is composed of a plurality of TF bins and the number of TF bins is determined, taking into account the characteristics of the channel. In determining the number of TF bins for a channel, the lowest data rate of packet data is considered if the channel is a packet data channel, and signaling overhead of information about a scheduled channel is considered if scheduling is carried out. For a control channel, the number of TF bins is determined according to the number of bits transmitted per TTI.

A channel to be allocated to a UE is scheduled every TTI or set by higher signaling. In the illustrated case of FIG. 1, if a Data CHannel (DCH) 103 is allocated to a UE, packet data symbols 105 for the UE are mapped to the DCH 103 by channel mapping 104 and then mapped to actual TF bins by subcarrier mapping 102. During the subcarrier mapping 102, the channel may be mapped to scattered TF bins (e.g. a DCH 106) or successive TF bins (e.g. the DCH 103), depending on whether frequency diversity is to be achieved or according to a TF bin 4 allocation algorithm. Since the channel is a logical channel, when only an allocated channel is transmitted as with a UE, there may not be a need for channel mapping because transmission symbols are simply mapped to pre-defined TF bins of the allocated channel.

HARQ is a technique for increasing a reception success rate by soft-combining initial transmission data with retransmission data without discarding the initial transmission data. A HARQ receiver determines whether a received packet has errors and transmits a HARQ ACK signal or a HARQ NACK signal to a HARQ transmitter according to the determination result. Accordingly, the HARQ transmitter retransmits the HARQ packet or transmits a new HARQ packet according to the received HARQ ACK/NACK signal.

HARQ is categorized into synchronous HARQ and asynchronous HARQ according to the timing of retransmission. In synchronous HARQ, a retransmission occurs a predetermined time after completion of a previous transmission, whereas a retransmission occurs irrespective of the time of a previous transmission in asynchronous HARQ.

With reference to FIG. 2, a synchronous HARQ operation will be described in more detail. FIG. 2 illustrates a basic HARQ operation.

Referring to FIG. 2, a HARQ transmitter transmits an initial HARQ packet on a DCH 202 by a predetermined process in step 203. A HARQ receiver decodes the initial HARQ packet and determines whether the initial HARQ packet has errors by a Cyclic Redundancy Check (CRC) check. In the presence of errors, the HARQ receiver stores the HARQ packet in a buffer and transmits an HARQ NACK to the HARQ transmitter on an ACK CHannel (ACKCH) 202 in step 205. In step 206, the HARQ transmitter retransmits the HARQ packet. The HARQ receiver soft-combines the stored HARQ packet with the retransmission HARQ packet and performs a CRC check in step 207. If the combined HARQ packet still has errors, the HARQ receiver stores the HARQ packet in the buffer and transmits an HARQ NACK to the HARQ transmitter. However, if decoding of the combined HARQ packet is successful, the HARQ receiver transmits an HARQ ACK to the HARQ transmitter in step 208.

The HARQ transmitter repeats the above operation until it receives an HARQ ACK from the HARQ receiver or the number of retransmissions for the HARQ packet reaches a predetermined retransmission number.

Now an ACK/NACK transmission method will be described.

Conventionally, a dedicated channel is allocated for a UE so that the UE can transmit an ACK/NACK signal. Under an environment where channels are non-orthogonal as with Code Division Multiple Access (CDMA), the total amount of available resources is limited by transmit power or reception interference level rather than it is directly related to the number of codes. Therefore, allocation of a code to each UE is not a significant problem in terms of resource utilization even if the UE does not use the dedicated channel. However, T-F resources are orthogonal and the amount of T-F resources directly affects that of available resources in FDM. Hence, when T-F resources allocated to an ACKCH are not used, it is a waste of resources. In other words, dedicated allocation of resources for ACK/NACK transmission on a UE-by-UE basis is inefficient in terms of resource utilization in an FDMA system.

In this context, one-to-one mapping between ACKCHs and DCHs or Shared Control CHannels (SCCHs) has been proposed and is under discussion in order to support HARQ efficiently in the FDMA system.

FIG. 3 illustrates one-to-one mapping between DCHs and ACKCHs.

Referring to FIG. 3, reference numerals 302 to 305 are DCHs and reference numerals 307 to 310 denote ACKCHs. The DCHs 302 to 305 are mapped to the ACKCHs 307 to 310 in a one-to-one correspondence and an ACK/NACK signal for a received DCH is transmitted on a predetermined ACKCH mapped to the DCH. If packet data is received on a first DCH 302 (DCH #1), an ACK/NACK signal for the packet data is transmitted on a first ACKCH 307 (ACKCH #1). If packet data is received on a second DCH 303 (DCH #2), an ACK/NACK signal for the packet data is transmitted on a second ACKCH 308 (ACKCH #2). The mapping between the ACKCHs and the DCHs enables ACK/NACK transmission without allocating dedicated frequent resources to UEs.

FIG. 18 illustrates one-to-one mapping between SCCHs and ACKCHs.

Referring to FIG. 18, reference numerals 1802 to 1805 are SCCHs and reference numerals 1807 to 1810 denote ACKCHs. The SCCHs 1802 to 1805 are mapped to the ACKCHs 1807 to 1810 in a one-to-one correspondence and an ACK/NACK signal for a received DCH is transmitted on a predetermined ACKCH mapped to an SCCH by which the DCH has been scheduled. If scheduling information about packet data is received on a first SCCH 1802 (SCCH #1), an ACK/NACK signal for the packet data is transmitted on a first ACKCH 1807 (ACKCH #1). If scheduling information about packet data is received on a second SCCH 1803 (SCCH #2), an ACK/NACK signal for the packet data is transmitted on a second ACKCH 1808 (ACKCH #2).

ACK/NACK repetition will be described below.

Typically, an ACK/NACK TTI is equal in length to a TTI of a general downlink frame or an uplink frame. When a Mobile Station (MS) at a cell boundary needs a transmit power exceeding a maximum allowed power, for ACK/NACK transmission, it transmits an ACK/NACK signal with the maximum allowed power. The resulting decreased received signal level renders the ACK/NACK transmission unreliable. To avert this problem, a High Speed Downlink Packet Access (HSDPA) system repeats the same ACK/NACK signal, so that instantaneous power level requirements are decreased as much as a repetition number and thus the ACK/NACK signal can be transmitted within a maximum allowed power level. Information about whether an ACK/NACK signal is repeated (hereinafter, referred to as ACK/NACK repetition setting information) is set in an upper-layer signaling message or a Medium Access Control (MAC) message by a network.

For ACK/NACK repetition, a repetition factor should be set in order to indicate whether an ACK/NACK signal is repeated and how many times the repetition occurs. For example, if the repetition factor is a non-zero number, the ACK/NACK signal is repeated as many times as the repetition factor. If the repetition factor is 0, the ACK/NACK signal is transmitted only once.

When a system with ACKCHs mapped to DCHs or SCCHs supports ACK/NACK repetition, it faces some problems, which will be addressed with reference to FIG. 4. In the illustrated case of FIG. 4, one cell has two UEs, UE #1 and UE #2. UE #1 is located at a cell boundary and UE #2 is near to a Node B at the center of the cell.

First, one-to-one mapping between DCHs and ACKCHs will be described.

Referring to FIG. 4, three ACK/NACK repetitions are set for UE #1 so that it can transmit an ACK/NACK signal reliably. Since UE #2 has sufficient transmit power, UE #2 is supposed to transmit an ACK/NACK signal only once.

Upon receipt of packet data on a first DCH 402 (DCH #1) in step 405, UE #1 transmits an ACK/NACK signal on a first ACKCH 402 (ACKCH #1) at time k=4 in step 407 and then repeats the ACK/NACK signals on ACKCH #1 at time k=5 and k=6 in steps 408 and 409. Meanwhile, a Node B may transmit packet data to UE #2 on DCH #1 during the next TTI through scheduling in step 406. Then UE #2 transmits an ACK/NACK signal for the received packet data on ACKCH #1 at time k=5 in step 410. Thus, the ACK/NACK signals from UE #1 and UE #2 collide on ACKCH #1 at time k=5. This data collision occurs because UEs share the ACKCHs and the DCHs are mapped to the ACKCHs in a one-to-one correspondence.

ACK/NACK repetition is viable on the premise that an ACKCH can be allocated to a UE for a plurality of TTIs. However, data is transmitted on a DCH only during one TTI and the one-to-one mapping between ACKCHs and DCHs does not allow for allocation of an ACKCH mapped to the DCH long enough for ACK/NACK transmission. As SCCHs are also transmitted on a TTI basis, the one-to-one mapping between SCCHs and ACKCHs illustrated in FIG. 18 leads to the same problem.

SUMMARY OF THE INVENTION

An aspect of the present invention is to address at least the problems and/or disadvantages and to provide at least the advantages described below. Accordingly, an aspect of the present invention is to provide a method and apparatus for supporting ACK/NACK repetition when ACKCHs are mapped to DCHs or SCCHs in an FDMA wireless communication system.

Another aspect of the present invention is to provide a method and apparatus for enabling ACK/NACK repetition by allocating more ACKCHs than SCCHs or SCCHs in an FDMA wireless communication system.

A further aspect of the present invention is to provide a method and apparatus for selecting a supplementary ACKCH for ACK/NACK repetition, when basic ACKCHs are allocated for as many DCHs or SCCHs and simultaneously, supplementary ACKCHs are allocated in an FDMA wireless communication system.

Still another aspect of the present invention is to provide a method and apparatus for supporting ACK/NACK repetition by allocating a supplementary ACKCH dedicatedly to a UE that will repeats an ACK/NACK signal in an FDMA wireless communication system.

In accordance with an aspect of exemplary embodiments of the present invention, there is provided a method for transmitting an ACK/NACK signal to support a retransmission of packet data received from a Node B in a UE in an FDMA wireless communication system, in which the UE generates an ACK/NACK signal for received packet data, determines whether the UE is set to support ACK/NACK repetition, transmits the ACK/NACK signal on a basic response channel mapped to one of a DCH on which the packet data was received and an SCCH carrying scheduling information about the packet data, if the UE is not set to support ACK/NACK repetition, and selects one of supplementary response channels for each ACK/NACK repetition, the supplementary response channels being allocated for ACK/NACK repetition and repeatedly transmits the ACK/NACK signal on the selected supplementary response channel according to a predetermined repetition factor, if the UE is set to support ACK/NACK repetition.

In accordance with an aspect of exemplary embodiments of the present invention, there is provided a method for receiving an ACK/NACK signal from a UE to support a retransmission of packet data in an FDMA wireless communication system, in which it is determined whether the UE is set to support ACK/NACK repetition, an ACK/NACK signal for transmitted packet data is received on a basic response channel mapped to one of a DCH on which the packet data was transmitted and an SCCH on which information about the packet data was transmitted, if the UE is not set to support ACK/NACK repetition, and one of supplementary response channels is selected for each ACK/NACK repetition, the supplementary response channels being allocated for ACK/NACK repetition, and the ACK/NACK signal is received repeatedly on the selected supplementary response channel according to a predetermined repetition factor, if the UE is set to support ACK/NACK repetition.

In accordance with an aspect of exemplary embodiments of the present invention, there is provided an apparatus of a UE for transmitting an ACK/NACK signal to support a retransmission of packet data received from a Node B in an FDMA wireless communication system, in which a response channel decider selects a response channel that will carry an ACK/NACK signal according to information about all response channels, one of information about a DCH on which packet data was received and information about an SCCH on which scheduling information about the packet data was received, and a repetition factor for the ACK/NACK signal, a response generator generates the ACK/NACK signal for the packet data, and a multiplexer maps the ACK/NACK signal to physical layer resources corresponding to the selected response channel and transmits the ACK/NACK signal repeatedly according to the repetition factor.

In accordance with an aspect of exemplary embodiments of the present invention, there is provided an apparatus for receiving an ACK/NACK signal from a UE to support a retransmission of packet data to the UE in an FDMA wireless communication system, in which a response channel decider selects a response channel on which an ACK/NACK signal will be received according to information about all response channels, one of information about a DCH on which packet data was transmitted and information about an SCCH on which scheduling information about the packet data was transmitted, and a repetition factor for the ACK/NACK signal, a demultiplexer extracts the ACK/NACK signal from signals received on physical channels according to the selected response channel, and a response decoder decodes the extracted the ACK/NACK signal and acquires ACK-NACK information for the packet data transmitted to the UE.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for solving a problem encountered with ACK/NACK repetition in the case where ACKCHs are mapped to DCHs or SCCHs and thus shared among UEs in an FDMA wireless communication system.

For this purpose, the present invention allocates more ACKCHs than DCHs or SCCHs to support ACK/NACK repetition. Therefore, the following description is made of a method for allocating supplementary ACKCHs, a method for selecting an ACKCH in a UE that will transmit an ACK/NACK signal repeatedly, a transmitter for transmitting an ACK/NACK signal, and a receiver for receiving an ACK/NACK signal.

While the present invention is applicable to any ACKCH allocation for downlink HARQ and uplink HARQ, it will be described in the context of an uplink ACK/NACK allocation to support downlink HARQ.

Embodiment 1

In accordance with a first exemplary embodiment of the present invention, supplementary ACKCHs are allocated, besides basic ACKCHs. If a UE is supposed to transmit an ACK/NACK signal repeatedly, the UE always transmits repeated ACK/NACK signals on a supplementary ACKCH.

Figure 1:
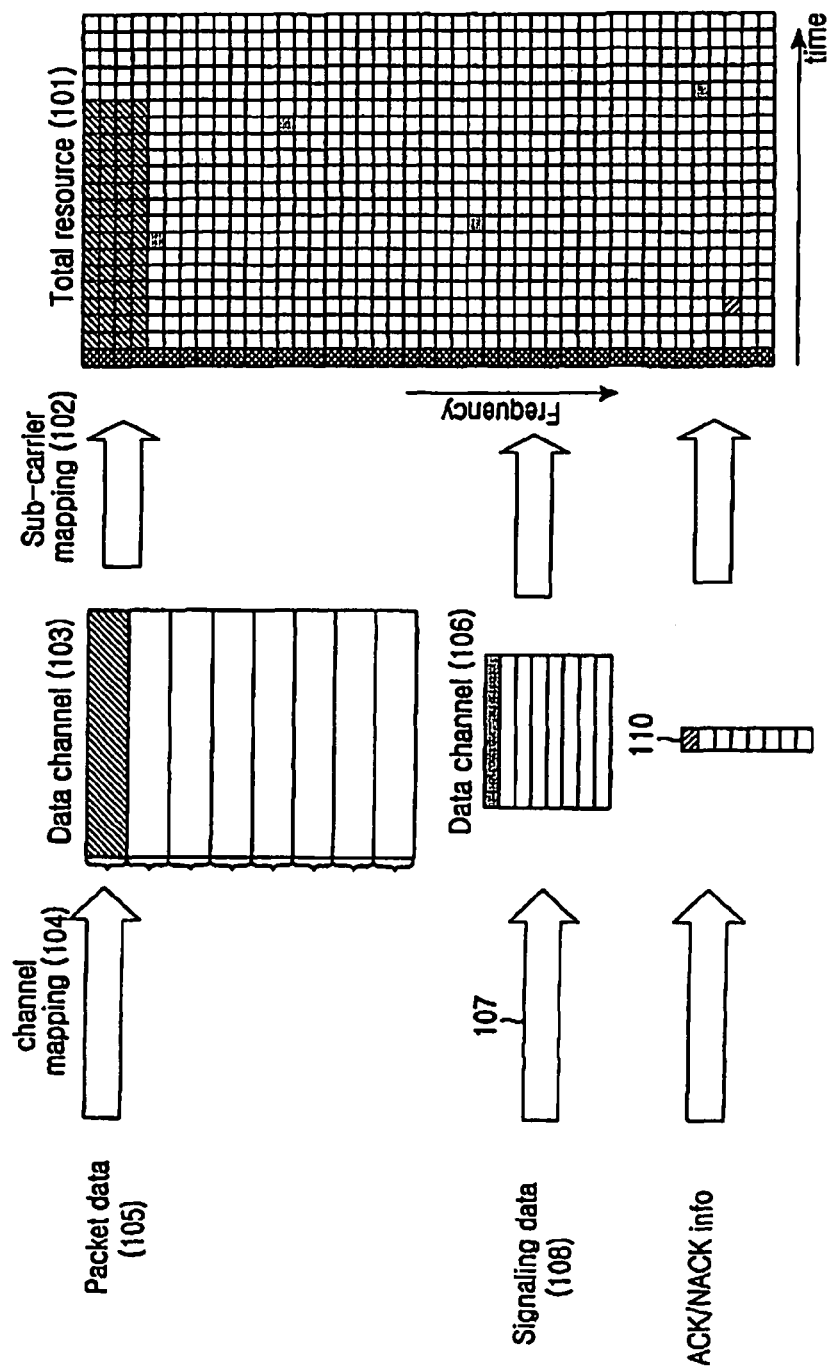
FIG. 1 illustrates FDMA.
Figure 2:
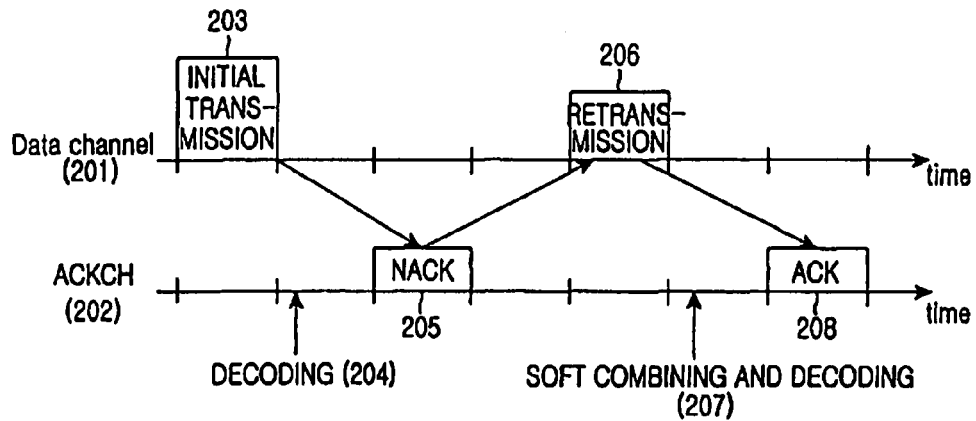
FIG. 2 illustrates a basic HARQ operation.
Figure 3:
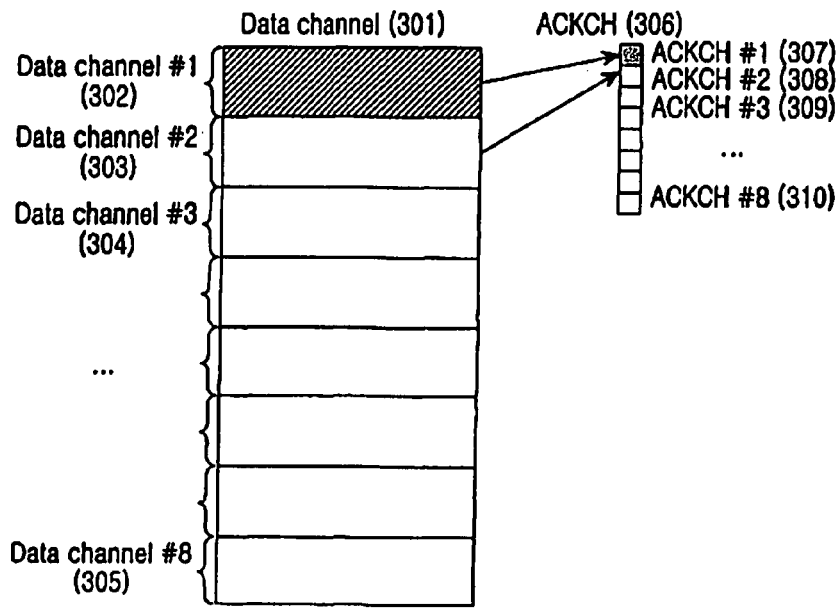
FIG. 3 illustrates one-to-one mapping between DCHs and ACKCHs.
Figure 4:
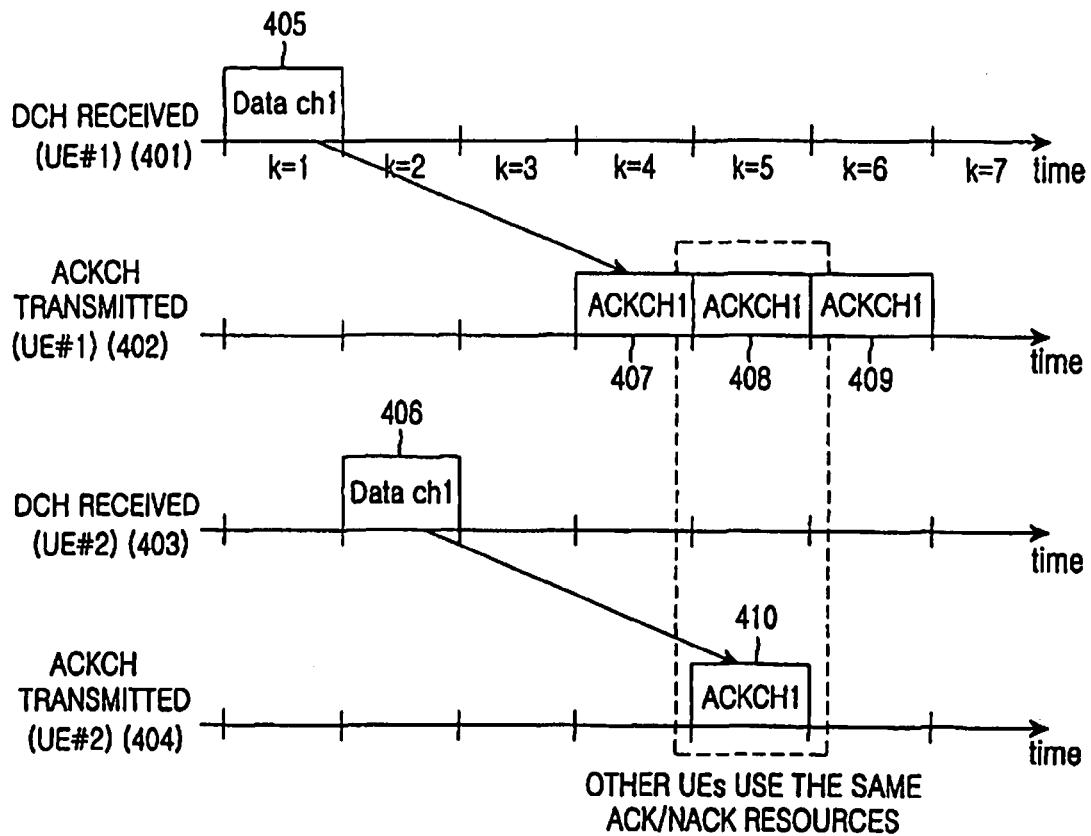
FIG. 4 illustrates a problem encountered with ACK/NACK repetition when DCHs are mapped to ACKCHs in a one-to-one correspondence.
Figure 5:
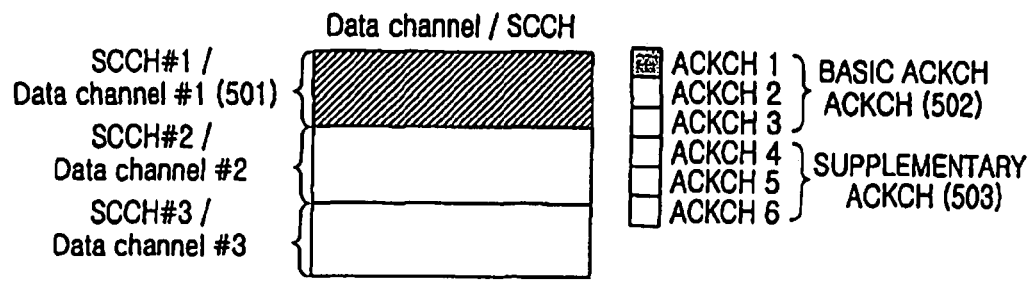
FIG. 5 illustrates ACKCH allocation according to a first exemplary embodiment of the present invention.

FIG. 5 illustrates ACKCH allocation according to the first exemplary embodiment of the present invention.

Referring to FIG. 5, three DCHs 501 (or SCCHS) are allocated. Compared to the conventional technology in which three ACKCHs are allocated for one-to-one mapping to the DCHs or SCCHs, six ACKCHs 502 and 503 are allocated to support ACK/NACK repetition in this exemplary embodiment of the present invention. Three of the ACKCHs 502 and 503 are basic ones 502 and the other three are supplemental ones 503.

Figure 6:
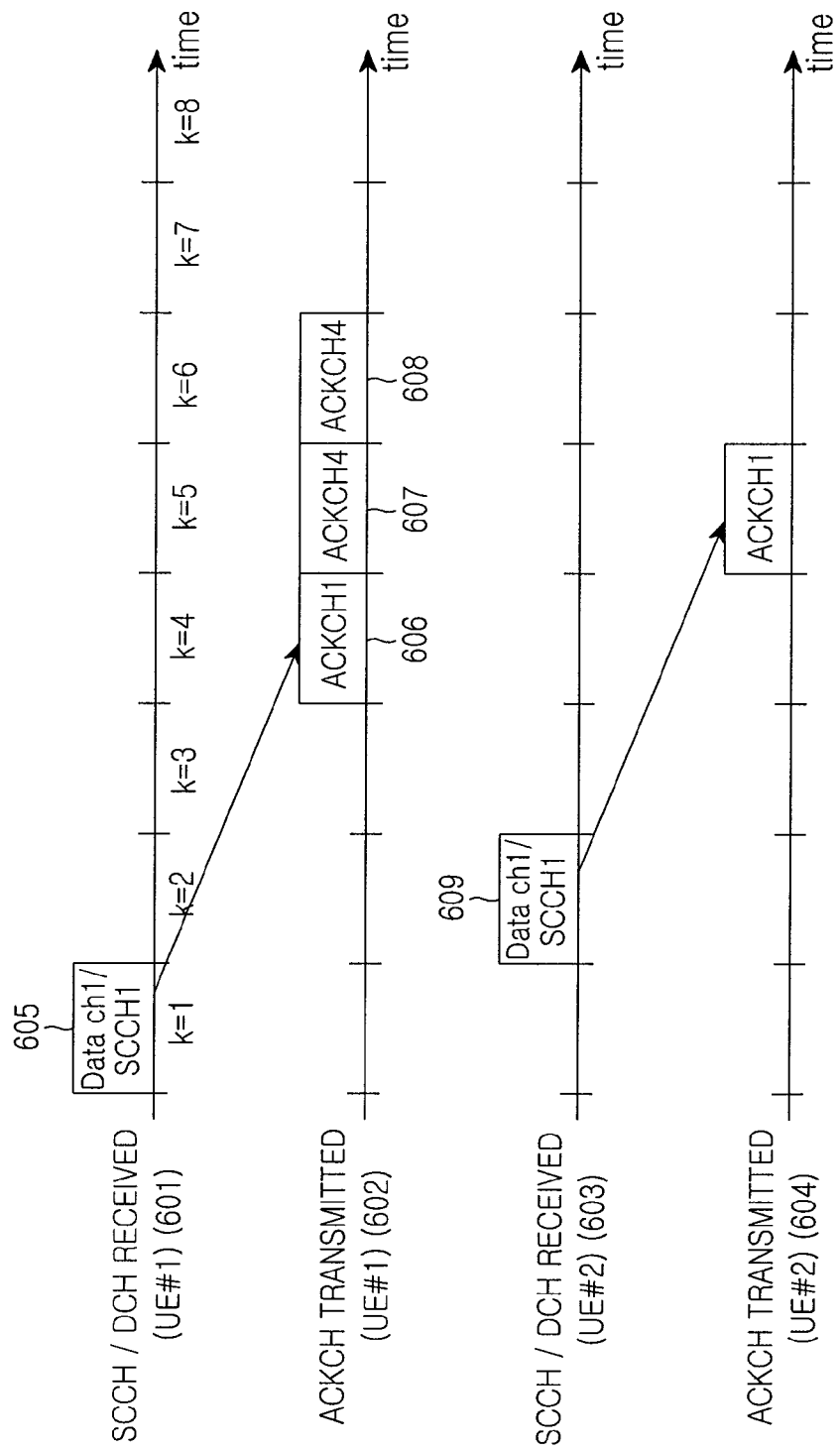
FIG. 6 illustrates ACK/NACK transmission according to the first exemplary embodiment of the present invention.

With the allocated ACKCHs, UEs transmit ACK/NACK signals in the manner illustrated in FIG. 6.

FIG. 6 illustrates ACK/NACK transmission according to the first exemplary embodiment of the present invention.

Referring to FIG. 6, UE #1 is set to support ACK/NACK repetition, while UE #2 is not set to support ACK/NACK repetition. A repetition factor R for UE #1 is 2. When receiving packet data on DCH #1 or scheduling information about the packet data on SCCH #1 in a first frame (k=1) in step 605, UE #1 transmits an ACK/NACK signal on ACKCH #1 in a fourth frame (k=4) in step 606. As UE #1 supports ACK/NACK repetition, it retransmits the same ACK/NACK signal on ACKCH #4 mapped to DCH #1 or SCCH #1, for ACK/NACK repetition in fifth and sixth frames (k=5 and 6) in steps 607 and 608. In this manner, an ACK/NACK collision is avoided between UE #1 and UE #2 in the fifth frame (k=5).

In asynchronous HARQ, because retransmission time points are not fixed, three TTIs of ACKCH transmission do not affect retransmission time points. However, the retransmission time points of UE #1 and UE #2 may be changed in synchronous HARQ. Thus, a UE or a Node B uses a parameter that determines a repetition number in calculating a retransmission time point, to thereby secure an appropriate processing time.

Figure 7:
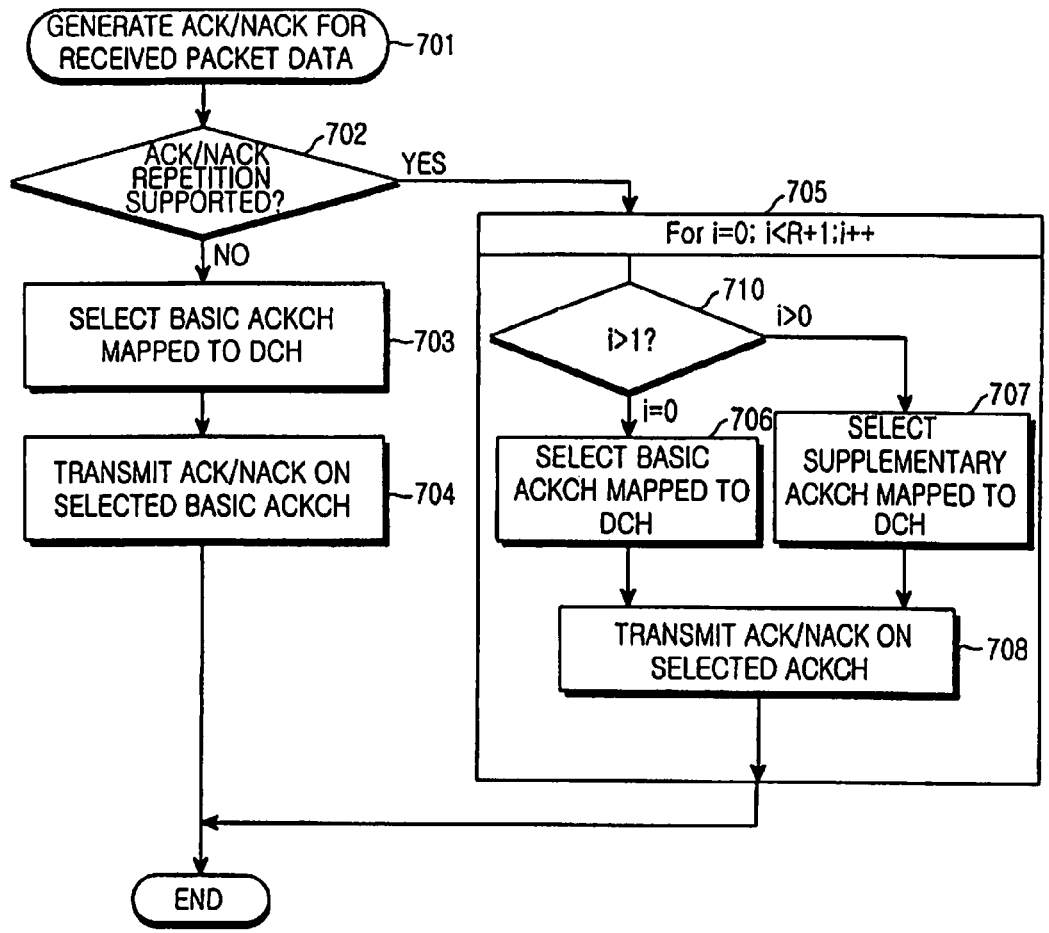
FIG. 7 is a flowchart illustrating ACK/NACK selection according to the first exemplary embodiment of the present invention.

FIG. 7 is a flowchart illustrating ACK/NACK selection in a UE according to the exemplary embodiment of the present invention.

Referring to FIG. 7, the UE demodulates received packet data and generates an ACK/NACK signal depending on whether the packet data has errors in step 701. In step 702, the UE checks whether it is set to support ACK/NACK repetition to select an ACKCH that will carry the ACK/NACK signal. If ACK/NACK repetition setting information is set to repetition, or a repetition factor R is larger than 0, the UE is supposed to repeat the ACK/NACK signal.

If the UE is not supposed to repeat the ACK/NACK signal, it transmits the ACK/NACK signal on a basic ACKCH in steps 703 and 704. The basic ACKCH is determined according to a DCH on which the packet data has been received or an SCCH that delivers scheduling information about the packet data.

If the UE is supposed to repeat the ACK/NACK signal, it performs (R+1) loops because as many ACK/NACK repetitions as the repetition factor R have to occur in step 705. To be more specific, the UE determines whether a current ACK/NACK transmission is an initial transmission in step 710. In the case of the initial ACK/NACK transmission (i=0, i is a variable indicating the number of repetitions), the UE selects the basic ACKCH mapped to the DCH or the SCCH in step 706 and transmits the ACK/NACK signal on the basic ACKCH. If i is greater than or equal to 1, the UE selects a supplementary ACKCH mapped to the DCH or the SCCH in step 707. In step 708, the UE retransmits the ACK/NACK signal on the supplementary ACKCH.

A Node B operates in a similar manner to the UE. In the method illustrated in FIG. 7, the Node B selects an ACKCH, receives the ACK/NACK signal from the UE on the selected ACKCH, and decodes it.

Figure 8:
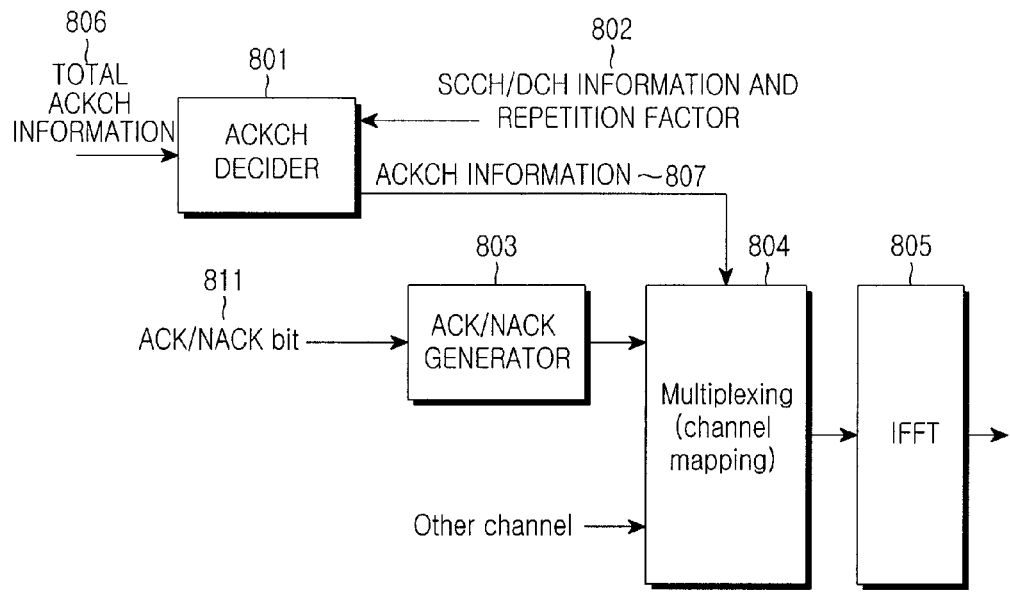
FIG. 8 is a block diagram of an ACK/NACK transmitter according to the first exemplary embodiment of the present invention.

FIG. 8 is a block diagram of an ACK/NACK transmitter according to the first exemplary embodiment of the present invention.

Referring to FIG. 8, an ACKCH decider 801 receives information about all ACKCHs 806, information about a received DCH (or information about an SCCH carrying scheduling information about the DCH) 802, and a repetition factor R 802 and selects an ACKCH 807 on which to transmit an ACK/NACK signal at a current transmission time point. The total ACKCH information 806 may be preset or notified by upper-layer signaling. The DCH information or the SCCH information is received from a receiver that has received packet data and the repetition factor R is received by upper-layer signaling.

An ACKCH generator 803 encodes or modulates an actual ACK/NACK bit 811 generated according to the reception result of the packet data in a predetermined format.

A Multiplexer (MUX) 804 maps the ACK/NACK signal received from the ACKCH generator 803 to predetermined physical layer resources according to ACKCH information 807 indicating the selected ACKCH received from the ACKCH decider 801.

An Inverse Fast Fourier Transform (IFFT) processor 805 IFFT-processes the mapped ACK/NACK signal.

Figure 9:
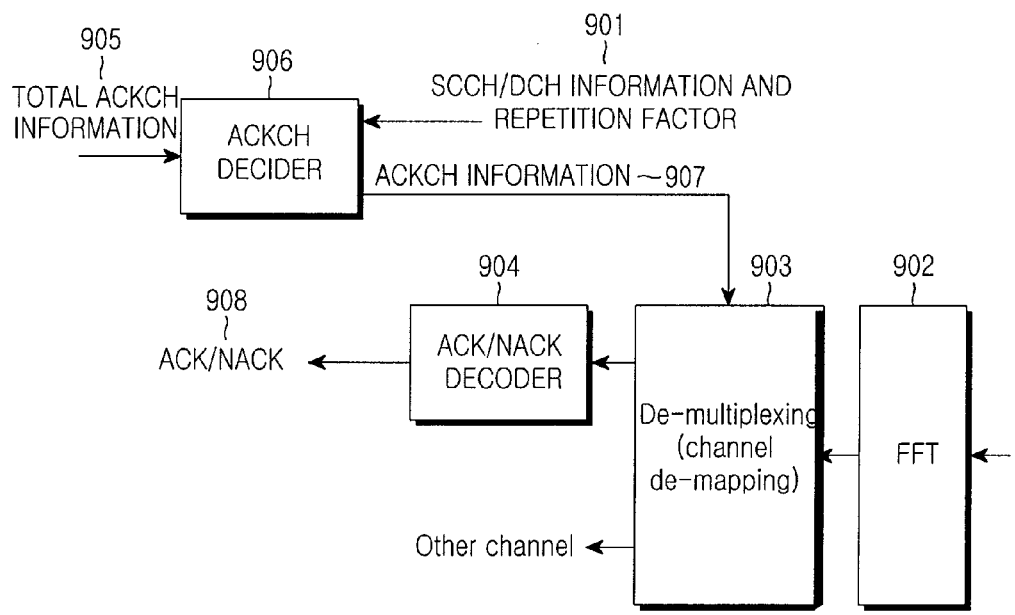
FIG. 9 is a block diagram of an ACK/NACK receiver according to the first exemplary embodiment of the present invention.

FIG. 9 is a block diagram of an ACK/NACK receiver according to the first exemplary embodiment of the present invention.

Referring to FIG. 9, an ACKCH decider 906 receives total ACKCH information 905, and information about a transmitted DCH or SCCH and a repetition factor R 901, and determines an ACKCH to receive at a current time point. The total ACKCH information may be preset or informed by upper-layer signaling. The DCH or SCCH information is received from a transmitter that has transmitted packet data and the repetition factor R is notified by upper-layer signaling.

A Demultiplexer (DEMUX) 903 is aware of physical layer resources corresponding to the determined ACKCH based on ACKCH information 907 indicating the determined ACKCH. That is, the DEMUX 903 extracts the ACKCH from all physical channel resources received from a Fast Fourier Transform (FFT) processor 902. A ACKCH decoder 904 acquires an actual ACK/NACK signal 908 by decoding and demodulating the ACKCH.

Embodiment 2

A shortcoming of the first exemplary embodiment of the present invention is that successive allocation of the same DCH to UEs that support ACK/NACK repetition may cause an ACK/NACK collision between the UEs because the same supplementary ACKCH is used to deliver repeated ACK/NACK signals. To overcome this problem, a Node B scheduler should allocate data channels such that UEs for which ACK/NACK repetition is set do not receive the same data channel in a successive manner. For instance, in FIG. 6, if UE #1 supports ACK/NACK repetition, scheduling is performed such that a DCH allocated to UE #1 in a current TTI is allocated to UE-#2 in the next TTI. Thus both UE #1 and UE #2 can transmit ACK/NACK signals without collision at time k=6.

In this context, a second exemplary embodiment of the present invention provides a method for supporting ACK/NACK repetition by allocating, to each UE, a supplementary ACKCHs for each ACK/NACK repetition of the UE.

Figure 10:
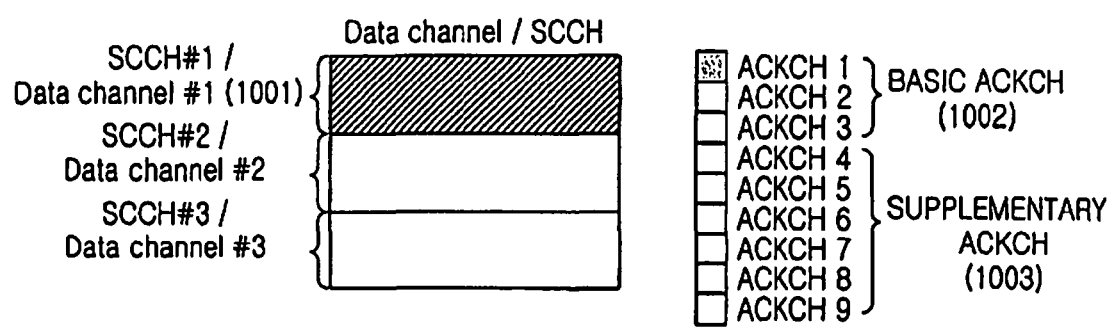
FIG. 10 illustrates ACKCH allocation according to a second exemplary embodiment of the present invention.

FIG. 10 illustrates ACKCH allocation according to the second exemplary embodiment of the present invention.

Referring to FIG. 10, three DCHs 1001 (or SCCHs) are allocated. Compared to the conventional technology in which three ACKCHs are allocated for one-to-one mapping to the DCHs or SCCHs, nine ACKCHs 1002 and 1003 are allocated to support ACK/NACK repetition in this exemplary embodiment of the present invention. Three of the ACKCHs 1002 and 1003 are basic ACKCHs 1002 and the other six are supplemental ACKCHs 1003. In this case, a repetition factor R that can support ACK/NACK repetition without collision in a cell is 2.

To implement the second exemplary embodiment of the present invention, an algorithm is proposed to select an ACKCH to deliver an ACK/NACK signal at a given time point from among a plurality of ACKCHs. An ACKCH can be selected according to Equation (1):

ACKCH for $i^{th}$ ACK/NACK transmission=$i$*(total number of DCHs or SCCHs)+(number of received DCH or SCCH($i$=0, . . . , $R$))    (1)

According to Equation (1), a different ACKCH is selected for each ACK/NACK repetition according to the current number of ACK/NACK repetitions and the number of a DCH or SCCH.

ACKCH for $i^{th}$ ACK/NACK transmission=((frame number of $i^{th}$($i$=0)ACK/NACK transmission) modular($R$+1))*(total number of DCHs or SCCHs)+(number of received DCH or SCCH)    (2)

According to Equation (2), a UE selects a different ACKCH with respect to a different packet data reception time, using a frame number instead of the current number of ACK/NACK repetitions. The frame number is an absolute count of frames. For example, the frame number is a system frame number or a connection frame number in a WCDMA system. In the above equation, the number of a frame in which packet data has been received may be substituted for the frame number of the $i^{th}$ ($i$=0) ACK/NACK transmission.

How a UE transmits an ACK/NACK signal by selecting an ACKCH using an ACKCH selection algorithm will be described below with reference to FIG. 11.

Figure 11:
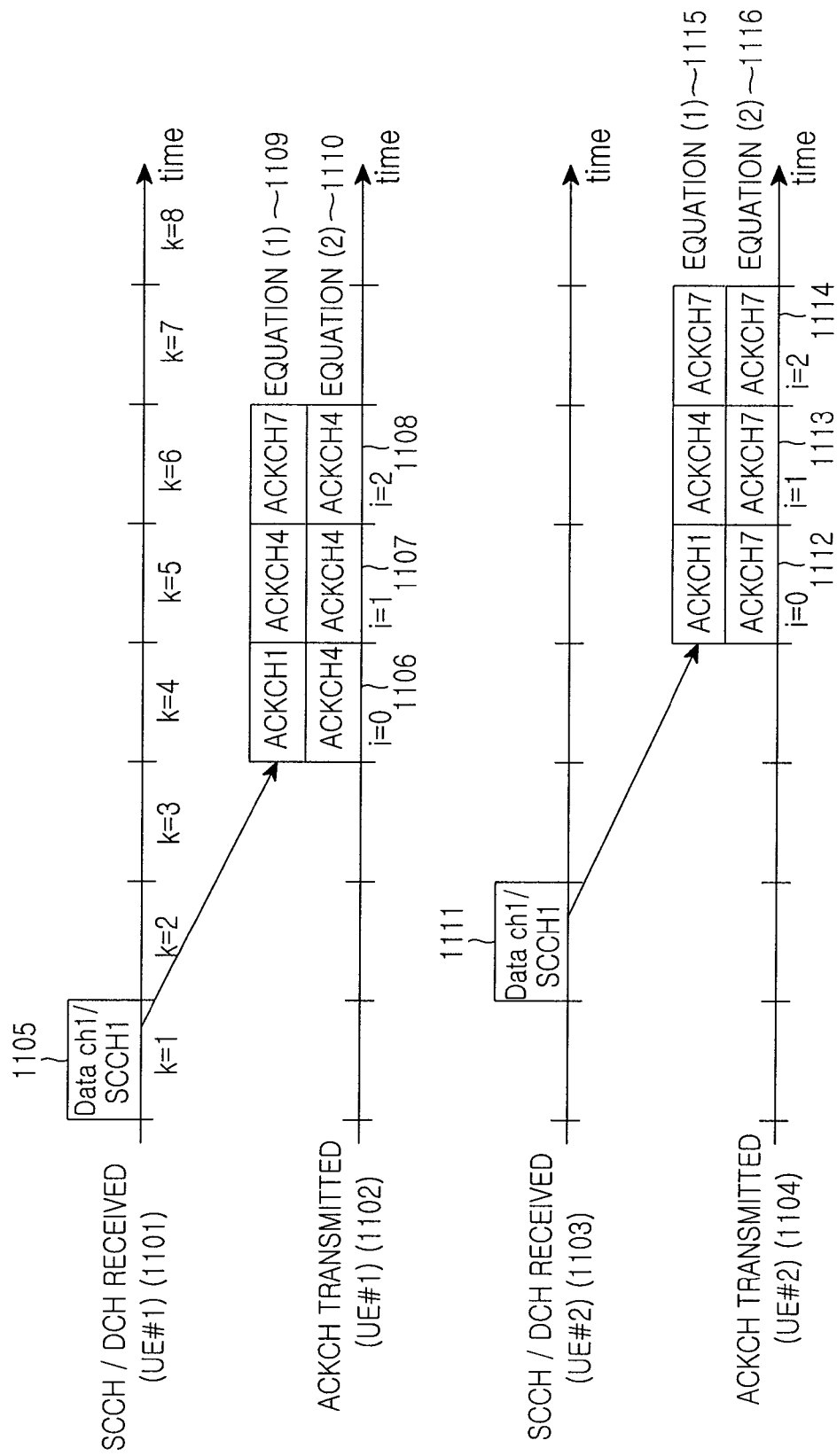
FIG. 11 illustrates ACK/NACK transmission according to the second exemplary embodiment of the present invention.

FIG. 11 illustrates ACK/NACK transmission according to the second exemplary embodiment of the present invention.

Referring to FIG. 11, UE #1 and UE #2 are set to support ACK/NACK repetition. A repetition factor R for UE #1 and UE#2 is 2. When receiving packet data on DCH #1 in a first frame (k=1) in step 1105, UE #1 transmits an ACK/NACK signal on ACKCH #4 in a fourth frame (k=4) in step 1106. ACKCH #4 is selected by the algorithm described in Equation (1) or Equation (2).

When the ACKCH is selected by Equation (1), UE #1 selects ACKCH #1 for DCH #1 when i=0, ACKCH #4 when i=1, and ACKCH #7 when i=2, as indicated by reference numeral 1109. In the same manner, UE #2 transmits ACK/NACK signals on the same ACKCHs as those of UE #1, as indicated by reference numeral 1115. However, since UE #1 and UE #2 transmit ACK/NACK signals at different times, there is no collision between them.

When the ACKCH is selected by Equation (2), UE #1 selects ACKCH #4 irrespective of i since it performs an $i^{th}$(i=0) ACK/NACK transmission at k=4 as indicated by reference numeral 1100. UE #2 selects ACKCH#7 because it receives data at k=2 and transmits an initial ACK/NACK signal at k=5, as indicated by reference numeral 1116.

Figure 12:
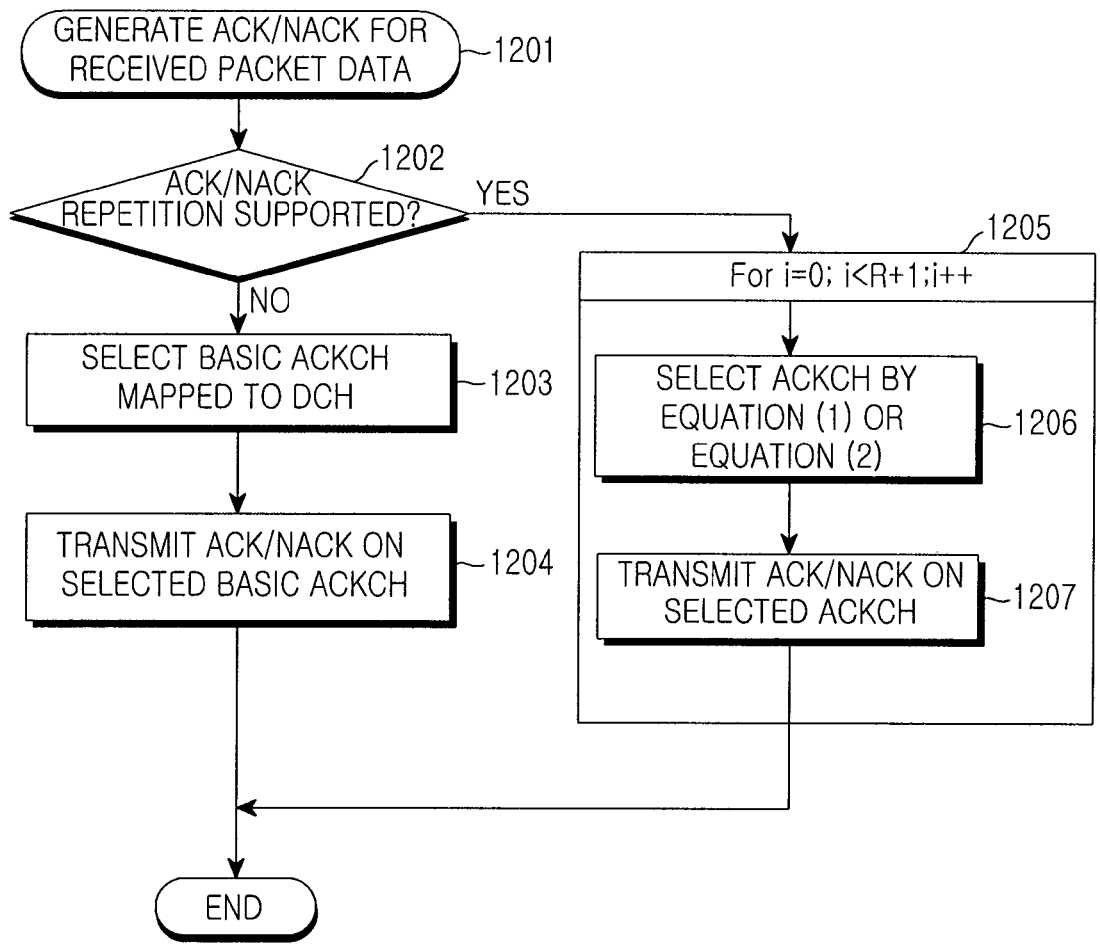
FIG. 12 is a flowchart illustrating ACK/NACK selection according to the second exemplary embodiment of the present invention.

FIG. 12 is a flowchart illustrating ACK/NACK selection according to the second exemplary embodiment of the present invention.

Referring to FIG. 12, a UE demodulates received packet data and generates an ACK/NACK signal depending on whether the packet data has errors in step 1201. In step 1202, the UE checks whether the UE is set to support ACK/NACK repetition in order to select an ACKCH that will carry the ACK/NACK signal. If ACK/NACK repetition setting information is set to repetition or a repetition factor R is larger than 0, the UE will repeat the ACK/NACK signal.

If the UE does not repeat the ACK/NACK signal, the UE selects a basic ACKCH in a general ACKCH selection method and transmits the ACK/NACK signal on the basic ACKCH in steps 1203 and 1204. The basic ACKCH is determined according to a DCH on which the packet data has been received or an SCCH that delivers scheduling information about the packet data.

If the UE repeats the ACK/NACK signal, the UE performs (R+1) loops because as many ACK/NACK repetitions as the repetition factor R must occur in step 1205. More specifically, the UE selects an ACKCH by Equation (1) or Equation (2) in step 1206 and transmits the ACK/NACK signal on the selected ACKCH in step 1207.

A Node B operates in a similar manner to the operation of the UE. In the method illustrated in FIG. 12, the Node B selects an ACKCH, receives the ACK/NACK signal from the UE on the selected ACKCH, and decodes it.

To implement the secondary exemplary embodiment of the present invention, an ACK/NACK transmitter and a ACK/NACK receiver are configured as in the first exemplary embodiment of the present invention, except that when Equation (2) is used, an ACKCH decider further receives a frame number as an input.

Embodiment 3

Despite the benefit of ACK/NACK repetition without collision between UEs that use the same DCH or SCCH, the second exemplary embodiment of the present invention requires as many additional ACKCHs as a repetition factor. Since ACK/NACK repetition will most likely occur for UEs at a cell boundary in real implementation, other UEs will not frequently use supplementary ACKCHs for ACK/NACK repetition. Thus, a third exemplary embodiment of the present invention proposes a method for a limited number of ACKCHs for each repetition to increase resource use efficiency.

Figure 13:
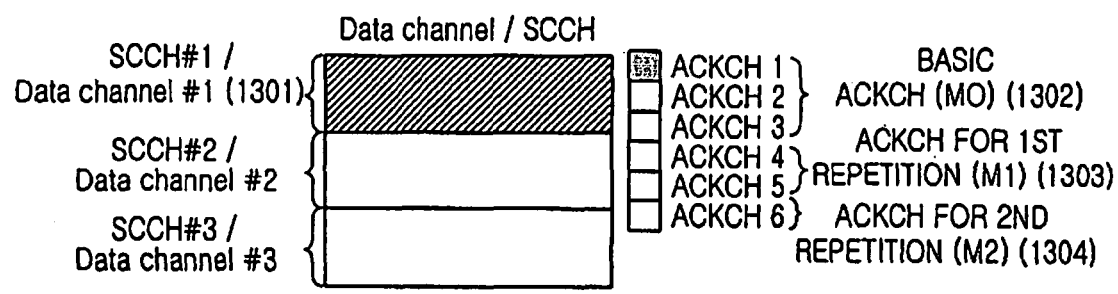
FIG. 13 illustrates ACKCH allocation according to a third exemplary embodiment of the present invention.

FIG. 13 illustrates ACKCH allocation according to a third exemplary embodiment of the present invention.

Referring to FIG. 13, M0 basic ACKCHs 1302 are allocated for as many DCHs or SCCHs. Thus, M0 is the number of the DCHs or SCCHs. M1 ACKCHs 1303 are allocated for a first ACK/NACK repetition and M2 ACKCHs 1304 are allocated for a second ACK/NACK repetition. If more ACK/NACK repetitions are allowed, M3, M4 . . . ACKCHs can be additionally allocated. M0, M1 and M2 are preset, or notified by upper-layer signaling.

From among the plurality of ACKCHs, an ACKCH to be transmitted at a given time point is selected according to Equation (3)

ACKCH for $i^{th}$ ACK/NACK transmission=$(i*M(i-1)+$ (number of received DCH or SCCH)) modular $(Mi)(i=0, \ldots, R)$ (3)

Equation (3) is an algorithm for selecting a different ACKCH for a different ACK/NACK repetition using the current number of ACK/NACK transmissions, information about a DCH or an SCCH, and information about ACKCHs allocated for each repetition number.

As noted from Equation (3), the number of ACKCHs set for a repetition is less than the total number of DCHs, a collision may occur during ACK/NACK transmission. This collision can be avoided by scheduling DCHs such that UEs support ACK/NACK repetition do not select the same ACKCH in a scheduler. For example, if DCH #1 (or SCCH #1) and DCH #3 (or SCCH #3) are simultaneously allocated to two UEs supporting ACK/NACK repetition, a collision occurs between them. In this case, DCH #1 (or SCCH #1) and DCH #2 (or SCCH #2) are allocated to the two UEs, while DCH #3 (or SCCH #3) is allocated to another UE that does not support ACK/NACK repetition. Then the collision does not occur.

Figure 14:
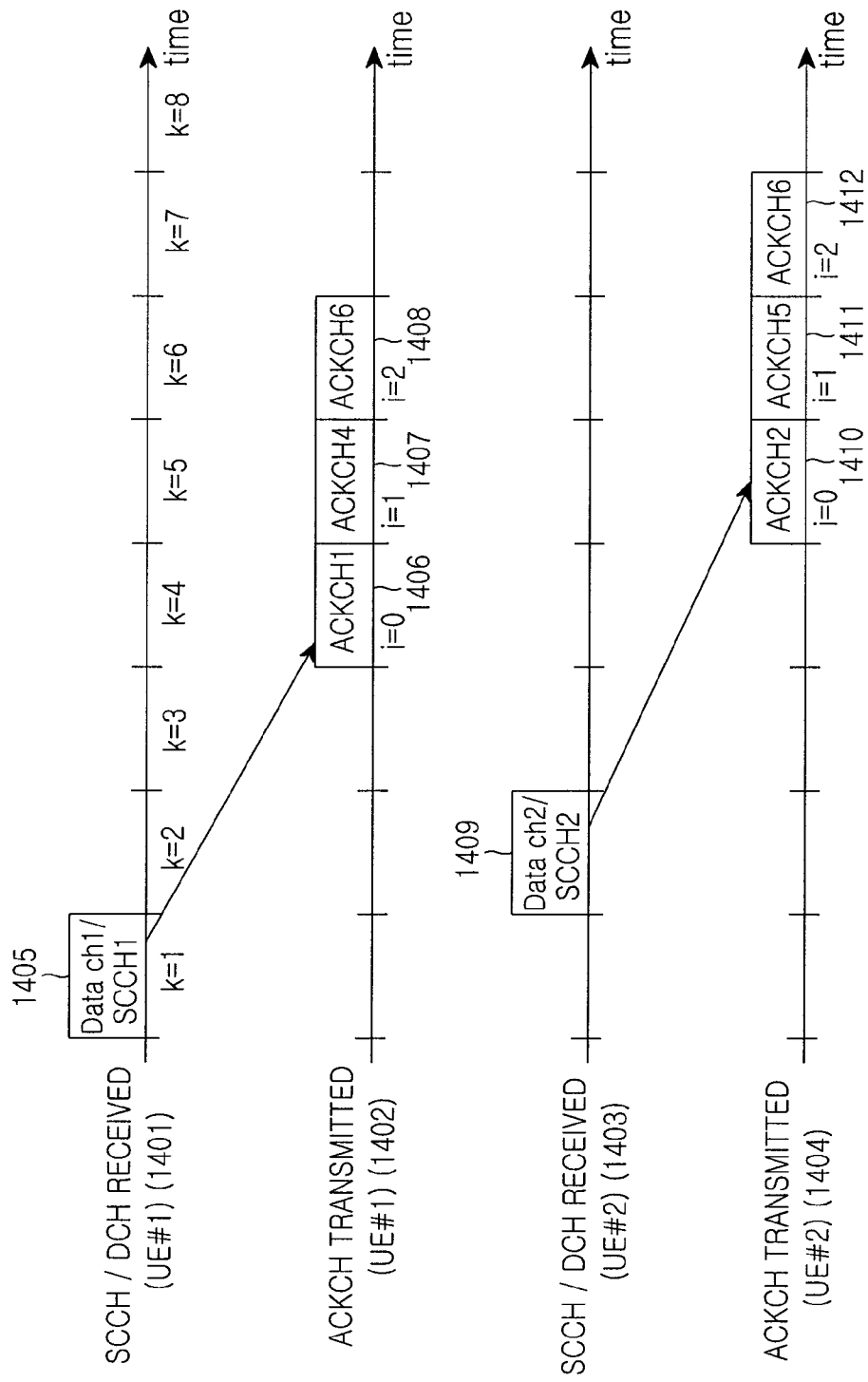
FIG. 14 illustrates ACK/NACK transmission according to the third exemplary embodiment of the present invention.

FIG. 14 illustrates ACK/NACK transmission according to the third exemplary embodiment of the present invention.

Referring to FIG. 14, UE #1 and UE #2 are set to support ACK/NACK repetition. A repetition factor R for UE#1 and UE#2 is 2, M0=3, M1=2, and M2=1. When receiving packet data on DCH #1 in a first frame (k=1) in step 1405, UE #1 transmits an ACK/NACK signal on ACKCH #4 in a fourth frame (k=4) in step 1406. UE #1 selects ACKCHs by Equation (3). Thus, UE #1 selects ACKCH #1 for DCH #1 when i=0 in step 1406, ACKCH #4 when i=1 in step 1407, and ACKCH #6 when i=2 in step 1408. Meanwhile, UE #2, which receives data on DCH #2 at k=2 in step 1409, selects ACKCH #2 corresponding to DCH #2 when i=0 in step 1410, ACKCH #5 when i=1 in step 1411, and ACKCH #6 when i=2 in step 1412.

The UE and a Node B operate in the same manner to as in the second exemplary embodiment of the present invention, except that Equation (3) is used instead of Equation (1) or Equation (2) in selecting an ACKCH in step 1206 of FIG. 12.

To implement the third exemplary embodiment of the present invention, an ACK/NACK transmitter and a ACK/NACK receiver are configured as in the first exemplary embodiment of the present invention and thus their description is not provided herein.

Embodiment 4

If a very small number of UEs support ACK/NACK repetition, allocation of shared ACKCHs results in ACKCH dissipation in the first, second and third exemplary embodiments of the present invention. Therefore, a fourth exemplary embodiment of the present invention is proposed in which a dedicated ACKCH is allocated to a UE supporting ACK/NACK repetition.

Figure 15:
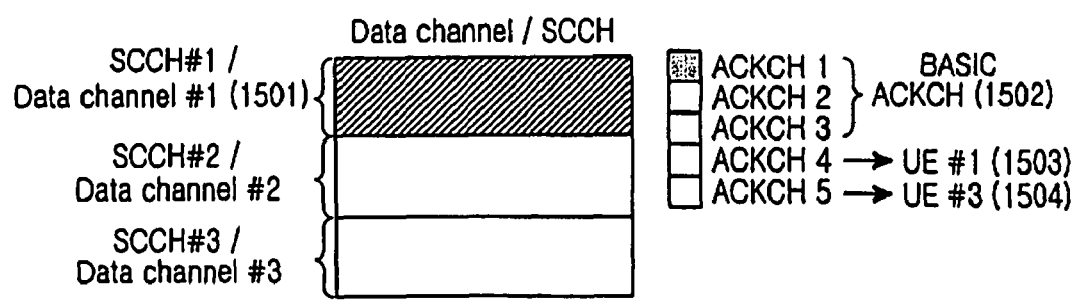
FIG. 15 illustrates ACKCH allocation according to a fourth exemplary embodiment of the present invention.

FIG. 15 illustrates ACKCH allocation according to the fourth exemplary embodiment of the present invention.

Referring to FIG. 15, basic ACKCHs 1502 are allocated in a one-to-one correspondence with DCHs or SCCHs. ACKCHs 1503 and 1504 are allocated for UEs supporting ACK/NACK repetition. UE #1 and UE #3 support ACK/NACK repetition. Since the basic ACKCHs 1502 are shared in a cell, information about the basic ACKCHs 1502 is provided using fixed resources defined by a specification or in system information. ACK/NACK information is provided to UEs supporting ACK/NACK repetition such as UE #1 and UE #3, along with channel information about the UEs by upper-layer signaling. In the illustrated case of FIG. 15, different ACKCHs are allocated to UE #1 and UE #3, but a Node B scheduler may allocate the same ACKCH to UE #1 and UE #3 and schedule it in the manner that prevents ACK/NACK collision between them.

Figure 16:
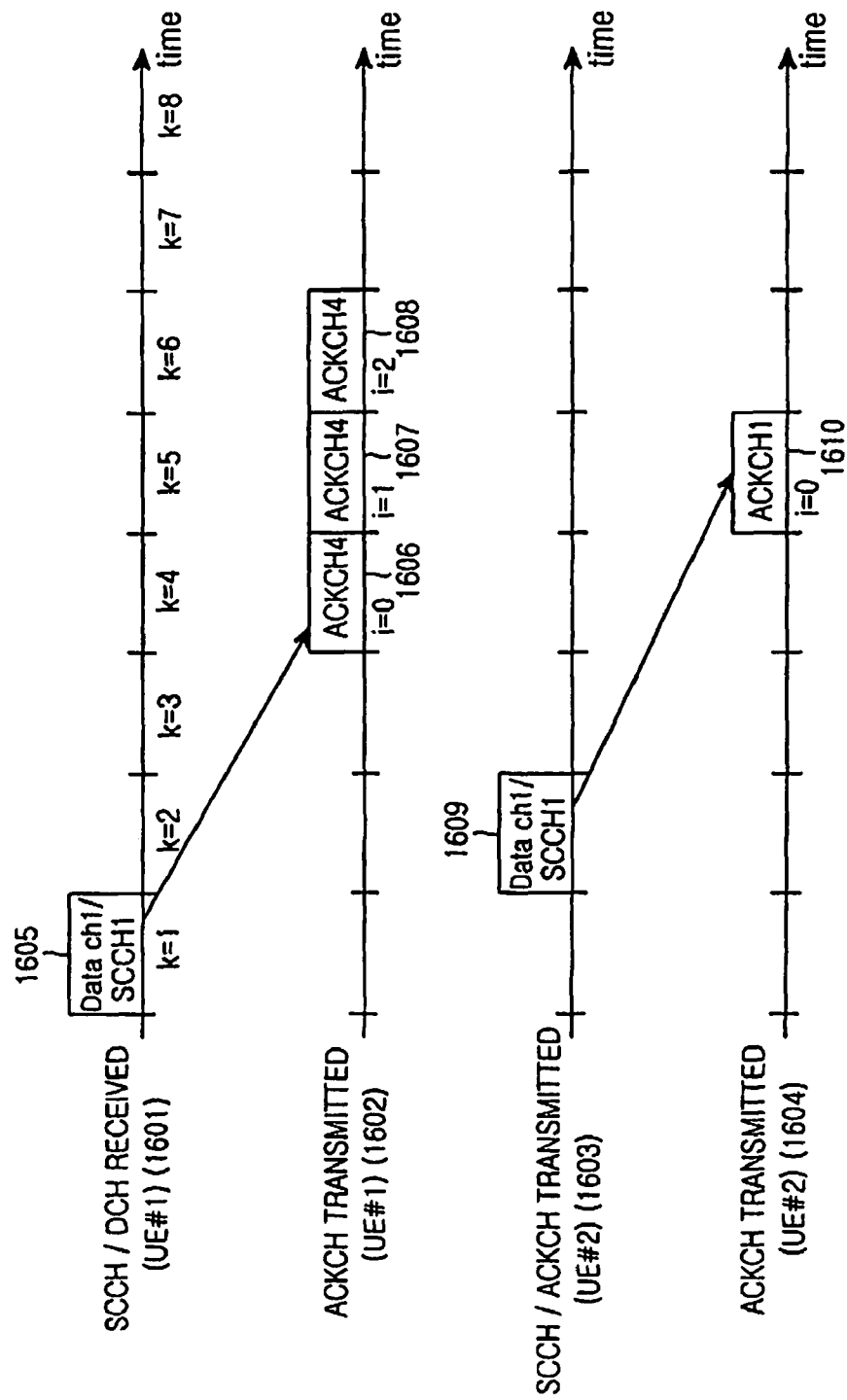
FIG. 16 illustrates ACK/NACK transmission according to the fourth exemplary embodiment of the present invention.

FIG. 16 illustrates ACK/NACK transmission according to the fourth exemplary embodiment of the present invention.

Referring to FIG. 16, UE #1 is set to support ACK/NACK repetition, while UE #2 is set to not support ACK/NACK repetition. A repetition factor R for UE #1 is 2. When receiving packet data on DCH #1 or scheduling information about the packet data on SCCH #1 in a first frame (k=1) in step 1605, UE #1 transmits/retransmits an ACK/NACK signal on ACKCH #4 in fourth, fifth and sixth frames (k=4, 5 and 6) in steps 1606, 1607 and 1608 because ACKCH #4 is allocated dedicatedly to UE #1 supporting ACK/NACK repetition.

However, when receiving packet data on DCH #1 or scheduling information about the packet data on SCCH #1 in a second frame (k=2) in step 1609, UE #2 transmits an ACK/NACK signal on ACKCH #1 corresponding to DCH #1 or SCCH #1 in the fifth frame (k=5) in step 1610 because UE #2 does not support ACK/NACK repetition.

Figure 17:
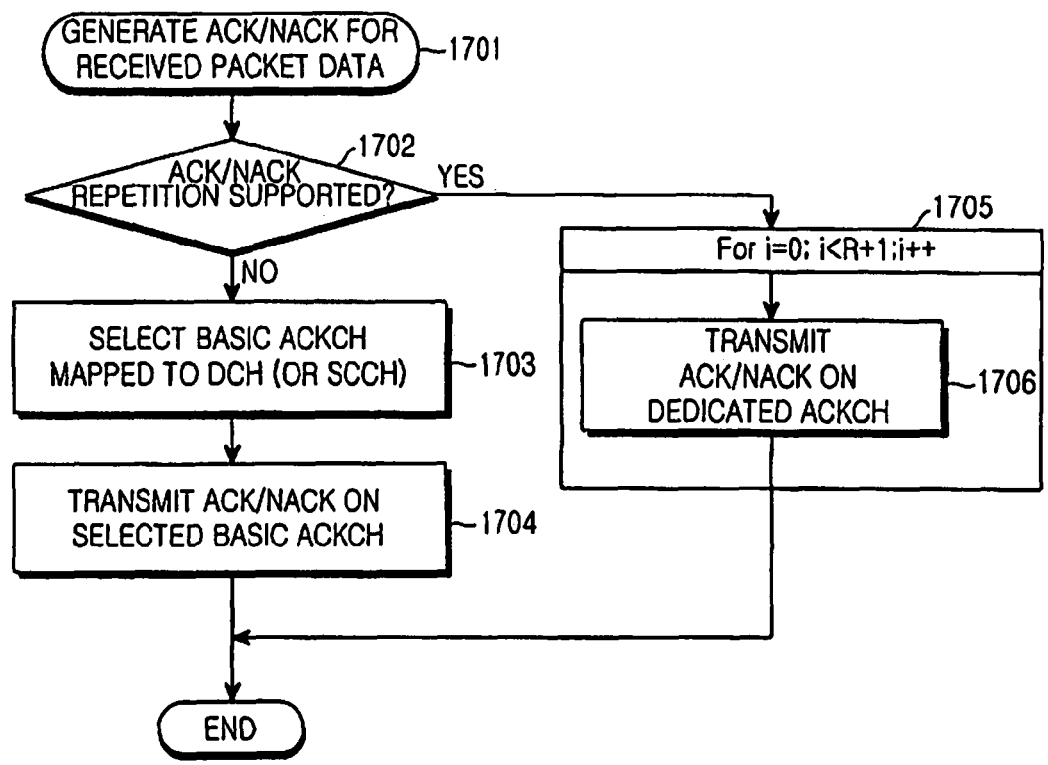
FIG. 17 is a flowchart illustrating ACK/NACK selection according to the fourth exemplary embodiment of the present invention.
Figure 18:
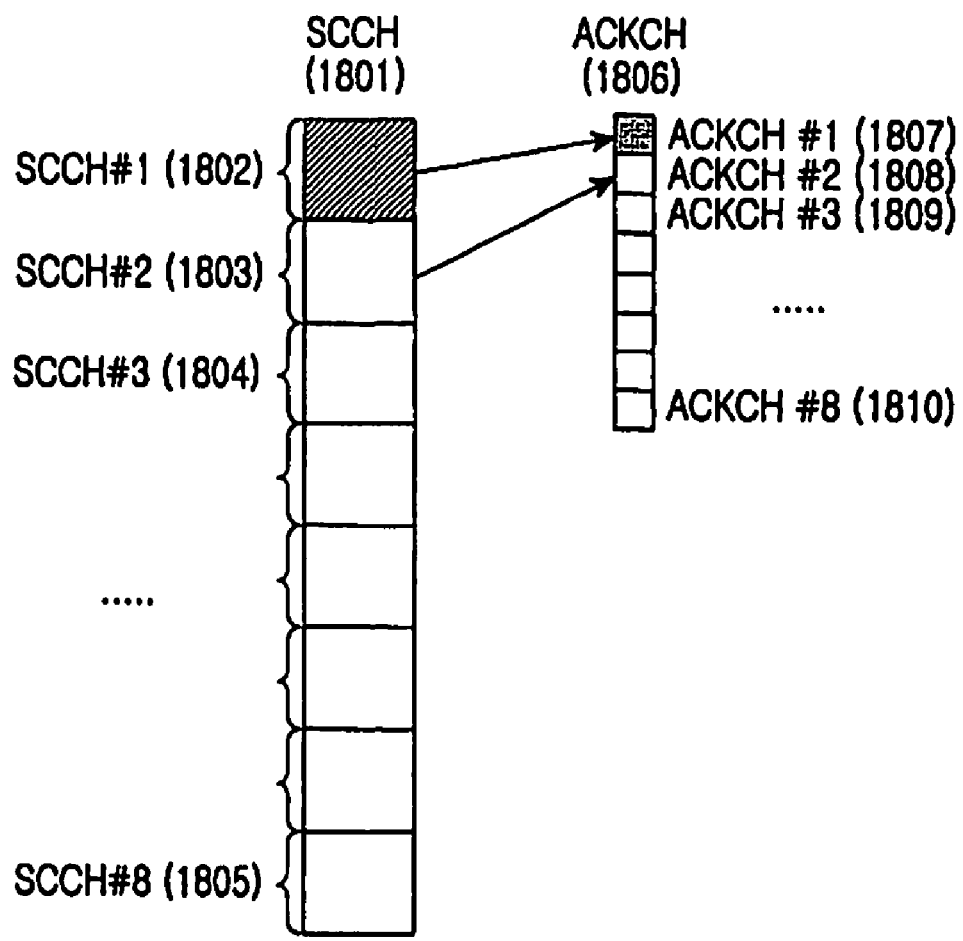
FIG. 18 illustrates one-to-one mapping between SCCHs and ACKCHs.

FIG. 17 is a flowchart illustrating ACK/NACK selection in a UE according to the fourth exemplary embodiment of the present invention.

Referring to FIG. 17, the UE demodulates received packet data and generates an ACK/NACK signal depending on whether the packet data has errors in step 1701. In step 1702, the UE checks whether it is set to support ACK/NACK repetition to select an ACKCH that will carry the ACK/NACK signal. If ACK/NACK repetition setting information is set to repetition, or a repetition factor R is larger than 0, the UE will repeat the ACK/NACK signal.

If the UE does not repeat the ACK/NACK signal, it selects a basic ACKCH in the general ACKCH selection method and transmits the ACK/NACK signal on the selected basic ACKCH in steps 1703 and 1704. The basic ACKCH is determined according to a DCH on which the packet data has been received or an SCCH that delivers scheduling information about the packet data.

If the UE repeats the ACK/NACK signal, it performs (R+1) loops because as many ACK/NACK repetitions as the repetition factor R have to occur in step 1705. Without selecting a basic ACKCH for each ACK/NACK transmission, the UE transmits/retransmits the ACK/NACK signal on a dedicated ACKCH allocated to the UE in step 1706.

A Node B operates in a similar manner to the operation of the UE. In the method illustrated in FIG. 17, the Node B selects an ACKCH, receives the ACK/NACK signal from the UE on the selected ACKCH, and decodes it.

As is apparent from the above description, the present invention supports ACK/NACK repetition when ACKCHs are mapped to DCHs or SCCHs in an FDMA wireless communication system. As ACK/NACK signals can be retransmitted without collision between UEs that support ACK/NACK repetition, even a UE remote from a Node B can transmit an ACK/NACK signal reliably, thereby expanding cell coverage.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting an ACKnowledgement/Negative ACKnowledgement (ACK/NACK) signal to support a retransmission of packet data received from a Node B in a User Equipment (UE) in a Frequency Division Multiple Access (FDMA) wireless communication system, the method comprising:
   generating an ACK/NACK signal for received packet data;
   determining whether the UE is set to support ACK/NACK repetition;
   if the UE is not set to support ACK/NACK repetition, transmitting the ACK/NACK signal on a basic response channel mapped to one of a Data CHannel (DCH) on which the packet data was received and a Shared Control CHannel (SCCH) carrying scheduling information about the packet data; and
   if the UE is set to support ACK/NACK repetition, selecting one of supplementary response channels for each ACK/NACK repetition, the supplementary response channels being allocated for ACK/NACK repetition, and repeatedly transmitting the ACK/NACK signal on the selected supplementary response channel according to a predetermined repetition factor.

2. The method of claim 1, wherein the supplementary response channel selection comprises:
   selecting the basic response channel mapped to one of the DCH and the SCCH for an initial ACK/NACK transmission; and
   selecting a supplementary response channel mapped to one of the DCH and the SCCH for an ACK/NACK retransmission.

3. The method of claim 1, wherein the supplementary response channel selection comprises selecting the supplementary response channel according to information about one of the DCH and the SCCH and the number of ACK/NACK transmissions, or selecting the supplementary response channel according to the information about one of the DCH and the SCCH and a transmission time of the ACK/NACK signal.

4. The method of claim 3, wherein the supplementary response channel selection comprises selecting a supplementary response channel for an $i^{th}$ ACK/NACK transmission according to a total number of the DCHs or the SCCHs and a number of the DCH carrying the packet data or the SCCH carrying the scheduling information about the packet data.

5. The method of claim 3, wherein the supplementary response channel selection comprises selecting a supplementary response channel for an $i^{th}$ ACK/NACK transmission according to a frame number of an $i^{th}$ (i=0) ACK/NACK transmission, the repetition factor, a total number of the DCHs or the SCCHs and a number of the DCH carrying the packet data or the SCCH carrying the scheduling information about the packet data.

6. The method of claim 1, wherein the supplementary response channel selection comprises selecting one of the supplementary response channels allocated on a repetition number basis according to information about one of the DCH and the SCCH and the number of ACK/NACK transmissions.

7. The method of claim 6, wherein the supplementary response channel selection comprises selecting a supplementary response channel for an $i^{th}$ ACK/NACK transmission according to a number of the supplementary response channels allocated for an $(i-1)^{th}$ transmission, a number of the DCHs carrying the packet data or the SCCHs carrying the scheduling information about the packet data and a number of the supplementary response channels allocated for an $i^{th}$ transmission.

8. The method of claim 7, wherein the number of supplementary response channels allocated for the $i^{th}$ ACK/NACK transmission is less than the number of supplementary response channels allocated for the $(i-1)^{th}$ ACK/NACK transmission.

9. The method of claim 1, wherein the supplementary response channel selection comprises selecting a dedicated supplementary response channel allocated to the UE.

10. A method for receiving an ACKnowledgement/Negative ACKnowledgement (ACK/NACK) signal from a User Equipment (UE) to support a retransmission of packet data in a Frequency Division Multiple Access (FDMA) wireless communication system, the method comprising:
    determining whether the UE is set to support ACK/NACK repetition;
    if the UE is not set to support ACK/NACK repetition, receiving an ACK/NACK signal for transmitted packet data on a basic response channel mapped to one of a Data CHannel (DCH) on which the packet data was transmitted and a Shared Control CHannel (SCCH) on which information about the packet data was transmitted; and
    if the UE is set to support ACK/NACK repetition, selecting one of supplementary response channels for each ACK/NACK repetition, the supplementary response channels being allocated for ACK/NACK repetition, and repeatedly receiving the ACK/NACK signal on the selected supplementary response channel according to a predetermined repetition factor.

11. The method of claim 10, wherein the supplementary response channel selection comprises:
    selecting the basic response channel mapped to one of the DCH and the SCCH for an initial ACK/NACK transmission; and
    selecting a supplementary response channel mapped to one of the DCH and the SCCH for an ACK/NACK retransmission.

12. The method of claim 10, wherein the supplementary response channel selection comprises selecting the supplementary response channel according to information about one of the DCH and the SCCH and the number of ACK/NACK transmissions from the UE, or selecting the supplementary response channel according to the information about one of the DCH and the SCCH and a reception time of the ACK/NACK signal.

13. The method of claim 12, wherein the supplementary response channel selection comprises selecting a supplementary response channel for an $i^{th}$ ACK/NACK transmission according to a total number of the DCHs or the SCCHs and a number of the DCH carrying the packet data or the SCCH carrying the scheduling information about the packet data.

14. The method of claim 12, wherein the supplementary response channel selection comprises selecting a supplementary response channel for an $i^{th}$ ACK/NACK transmission according to a frame number of an $i^{th}$ (i=0) ACK/NACK transmission, the repetition factor, a total number of the DCHs or the SCCHs and a number of the DCH carrying the packet data or the SCCH carrying the scheduling information about the packet data.

15. The method of claim 10, wherein the supplementary response channel selection comprises selecting one of supplementary response channels allocated on a repetition number basis according to information about one of the DCH and the SCCH and the number of ACK/NACK transmissions.

16. The method of claim 15, wherein the supplementary response channel selection comprises selecting a supplementary response channel for an $i^{th}$ ACK/NACK transmission according to a number of the supplementary response channels allocated for an $(i-1)^{th}$ transmission, a number of the DCH carrying the packet data or the SCCH carrying the scheduling information about the packet data and a number of the supplementary response channels allocated for an $i^{th}$ transmission.

17. The method of claim 16, wherein the number of supplementary response channels allocated for the $i^{th}$ ACK/NACK transmission is less than the number of supplementary response channels allocated for the $(i-1)^{th}$ ACK/NACK transmission.

18. The method of claim 10, wherein the supplementary response channel selection comprises selecting a dedicated supplementary response channel allocated to the UE.

* * * * *